(12) United States Patent
Ross et al.

(10) Patent No.: US 9,253,219 B2
(45) Date of Patent: Feb. 2, 2016

(54) SYSTEM AND METHOD TO INFLUENCE SIP ROUTING BY SEQUENCED APPLICATIONS

(75) Inventors: Timothy I. Ross, Fair Haven, NJ (US); Harsh V. Mendiratta, East Brunswick, NJ (US); Rajeshwari Edamadaka, Allentown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 799 days.

(21) Appl. No.: 13/434,917

(22) Filed: Mar. 30, 2012

(65) Prior Publication Data

US 2013/0259026 A1  Oct. 3, 2013

(51) Int. Cl.
*H04L 29/06* (2006.01)

(52) U.S. Cl.
CPC ........ *H04L 65/1069* (2013.01); *H04L 65/1083* (2013.01)

(58) Field of Classification Search
None
See application file for complete search history.

(56) References Cited

U.S. PATENT DOCUMENTS

| 5,745,539 | A  | * | 4/1998  | Lang ............................ 376/259 |
| 6,233,582 | B1 | * | 5/2001  | Traversat et al. ..................... 1/1 |
| 6,862,270 | B1 | * | 3/2005  | Ho ................. 370/328 |
| 7,395,338 | B2 | * | 7/2008  | Fujinaga ....................... 709/228 |
| 7,428,752 | B2 | * | 9/2008  | Rutherglen et al. ............. 726/12 |
| 8,775,524 | B2 | * | 7/2014  | Nissennboim ................ 709/206 |
| 2004/0196867 | A1 | * | 10/2004 | Ejzak et al. ................... 370/468 |
| 2007/0086582 | A1 | * | 4/2007  | Tai et al. .................. 379/114.01 |
| 2008/0304486 | A1 | * | 12/2008 | Graessley et al. ............. 370/392 |
| 2010/0299551 | A1 | * | 11/2010 | Han et al. .......................... 714/4 |
| 2011/0320936 | A1 | * | 12/2011 | Mohan et al. ................. 715/255 |
| 2012/0020350 | A1 | * | 1/2012  | Tai et al. ...................... 370/352 |
| 2012/0179821 | A1 | * | 7/2012  | Heidenreich et al. ......... 709/225 |
| 2012/0250675 | A1 | * | 10/2012 | Hillis et al. ................... 370/352 |

* cited by examiner

*Primary Examiner* — Hicham Foud
(74) *Attorney, Agent, or Firm* — Maldjian Law Group LLC

(57) ABSTRACT

A system and method to influence routing of a call by a sequenced application from among a plurality of sequenced applications is disclosed. The method comprises receiving a header for the call wherein the header comprises at least one directive from each of the plurality of sequenced applications. Further the method comprises arbitrating conflicts from among the one directive in the header in order to determine a set of sequenced application headers to at least partially execute. Finally, the determined set of sequenced application headers is at least partially executed.

40 Claims, 5 Drawing Sheets

SYSTEM AND METHOD TO INFLUENCE SIP ROUTING BY SEQUENCED APPLICATIONS

BACKGROUND

1. Field of the Invention

Embodiments of the present invention generally relate to sequenced applications, and, in particular, to a system and method for sequenced applications to indirectly influence the SIP routing of calls.

2. Description of Related Art

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Many SIP communications are enhanced by virtue of the fact that an application is inserted or included into the communication session during the establishment of that session. The incorporation of applications into a communication session is typically referred to as application sequencing because the applications are sequentially invoked during the establishment of the communication session. In some instances the applications are owned and operated by an enterprise that is administering the SIP network. In some instances, the applications may be provided by third-party vendors. In either event, the traditional way in which applications were included in the communication session was during the communication session establishment stage so that these applications can insert themselves into the signaling and media path of the communication session.

Exemplary types of applications that may be utilized for a communication session include, without limitation, call recording applications, communication log services, conferencing applications, security applications, encryption applications, collaboration applications, whiteboard applications, mobility applications, presence applications, media applications, messaging applications, bridging applications, and any other type of application that can supplement or enhance communications.

Session managers such as Avaya Aura™ for enterprise telephony networks allow sequencing of network applications at session origination and termination phases, in order to affect the way the session is routed in the network, and to allow features to be independently added to the system for handling a call.

A drawback of the known art is that there exists limited communication among sequenced applications. Although the SIP History-info message can help downstream applications discover upstream routing decisions, this message does not allow upstream apps to learn about downstream routing decisions. Furthermore, reliance upon the SIP History-info message does not prevent downstream applications from being bypassed by an upstream application. Limited communication also makes difficult coordinating communication among sequenced applications.

If an application independently processes SIP requests, downstream applications are easily bypassed or prevented from seeing the original request or how upstream applications processed the request. It also is difficult to arbitrate call control between upstream and downstream applications. For example, an upstream application may not want a call to be forwarded, but a downstream application may forward the call without guidance from the upstream application. Or, an upstream application may forward a call by retargeting the request; thus, bypassing the downstream application from ever seeing the request. Because of these issues, knowing the order of the application in the target deployment configuration becomes a critical factor for the application developer. Moreover, certain positions in the sequence, like first and last application in originating and terminating sequence, have become the sought after positions for majority of the applications.

Another drawback of the known art is that sequenced applications have strong coupling to one another and to their order of execution. Therefore, the sequence of applications is difficult to design or modify, and may be more prone to error or unexpected result when modified.

RFC 3841 describes a set of extensions to SIP which allow a caller to express preferences about request handling in servers. These preferences include the ability to select which Uniform Resource Identifiers (URI) a request gets routed to, and to specify certain request handling directives in proxies and redirect servers. It does so by defining three new request header fields, Accept-Contact, Reject-Contact, and Request-Disposition, which specify the caller's preferences with respect to proxy behavior. However, this solution is limited to the call originator, and does not address sequenced applications and media control, nor does it deal conflicts between multiple applications since there is only one entity (i.e., the UAC) adding preferences.

Use of a new or proprietary data field in the message or control data streams associated with the sequenced application may be known in the background art. For example, a History-info field may be used to inform downstream applications about upstream routing decisions. But a shortcoming of this process is that if the request is retargeted, information in the history-info field cannot prevent the downstream applications from being bypassed.

The known art of designing sequenced applications or sequencing the applications by use of B2BUA/Proxy, or by limiting usage by way of a proprietary history-info field do not address the problems identified above. For example, the known art do not reliably allow more than one sequenced application to influence routing. Another drawback of the known art is that the sequence in which applications are ordered (i.e., the execution order) affects the overall behavior of the applications together. Furthermore, there is no arbitration mechanism to resolve conflict among the sequenced applications.

These problems are limiting the proliferation and widespread adoption of applications based on Application Sequencing approach.

Therefore, a need exists to provide better awareness of the context of applications within a sequence vector in order to provide a more compatible and harmonious execution of sequenced applications.

SUMMARY

Embodiments in accordance with the present invention provide a system and method to influence routing of a call by a sequenced application from among a plurality of sequenced applications, the method including: receiving a header for the call, the header comprising at least one directive from one or more of the plurality of sequenced applications; arbitrating conflicts from among the at least one directive in the header, in order to determine a set of sequenced application headers to at least partially execute; and at least partially executing the set of sequenced application headers. Communication of the headers may be by way of SIP protocol, HTTP, a client/server architecture, and/or a bidirectional asynchronous protocol.

In another embodiments in accordance with the present invention, a method to influence routing of a call by a sequenced application from among a plurality of sequenced applications, comprises: receiving a header from a call session manager; inserting a directive into the header; and transmitting the header to a central proxy via the call session manager, wherein the central proxy is configured to arbitrate conflicts in directives in the header inserted by the plurality of sequenced applications.

In another embodiments in accordance with the present invention, a system to influence routing of a call by a sequenced application from among a plurality of sequenced applications, comprises: a receiver configured to receive a header for the call, the header comprising at least one directive from one or more of the plurality of sequenced applications; an arbitration module configured to arbitrate conflicts from among the at least one directive in the header, in order to determine a set of the plurality of sequenced applications to at least partially execute; a session manager used to at least partially execute the set of the plurality of sequenced applications; and a controller configured to control the session manager.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
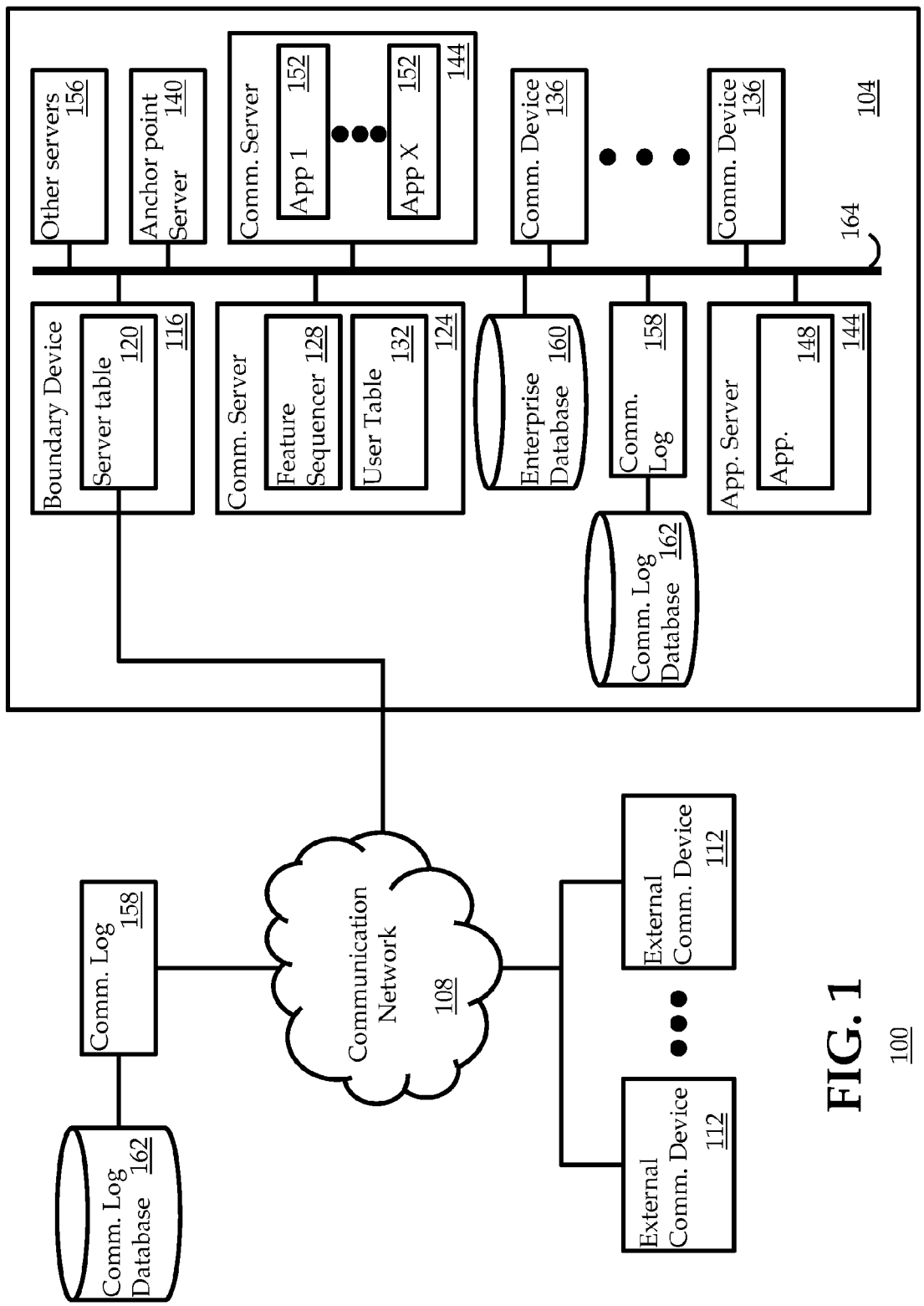
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database (s), the disclosure is not limited to use with any particular type of communication system or configuration of system elements. Those skilled in the art will recognize that the disclosed techniques may be used in any communication application in which it is desirable to utilize application sequencing.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

Embodiments of the present invention generally relate to cooperative application sequencing, and, in particular, to a system and method to provide a fairer and more efficient approach to application sequencing, this allowing applications to be lightweight while reducing coupling with neighboring applications. Embodiments in accordance with the present invention further provide a framework, model, or paradigm for independent and transparent arbitration.

Embodiments in accordance with the present invention address problems of the known art, by enabling richer interactions among multiple sequenced applications, and by facilitating communication and coordination among sequenced application.

Embodiments in accordance with the present invention enable arbitration among upstream and downstream applications.

Embodiments in accordance with the present invention lessen a need for sequence applications to independently fork the requests.

Embodiments in accordance with the present invention lessen problems associated with the ordering of sequenced applications within a sequence vector.

Embodiments in accordance with the present invention lessen a need for back-to-back user agent ("B2BUA"). For example, in recording or speech detection, the need for B2BUAs may be lessened by delegating the B2BUA functionality to the arbiter, by inserting appropriate header directives to cause or to invoke B2BUA functionality.

Embodiments in accordance with the present invention provide visibility to an upstream application related to processing to be performed by a downstream application.

Embodiments in accordance with the present invention enable downstream sequenced applications to be aware of the original request from an originator/originating SIP User Agent, or originating device, or application, along with pending operation directives from upstream applications.

Embodiments in accordance with the present invention reduce a need for an application to implement functionality handled by another application (e.g., call forwarding).

Embodiments in accordance with the present invention help with diagnosing problems related to routing and/or routing-related features, by centralizing the invocation of routing and routing-related features. Applications suggest routing behavior by use of operation directives, while implementation of the routing is done by a central arbitrator (i.e., a central processor, central proxy, etc.) that receives and processes the operation directives.

Documentation or a record of processing performed by the central processor may be by way of logs, or SIP traces to see what action was performed, and provide a record of the relevant routing-related operation directive(s), including providing the record to the requesting application. Arbitration decisions regarding conflicting operation directives can also be logged at this central place.

Upstream applications may view the routing decisions, made by the central arbitrator, by logging into the central arbitrator to view status of operation directives and explanations, status codes and the like for operation directives that were not performed. For example, if an application not being fully invoked causes customer complaints about features not working, then the central arbitrator can be traced or queried as to why the arbitrator did not honor a routing feature from the application, in order to either understand the arbitration decision, or to remedy underlying conditions that led to the arbitrator's decision. In contrast in the background art, if a feature is not invoked because an upstream application broke it, upstream logs and network status have be analyzed to figure where this breakage occurred.

Embodiments in accordance with the present invention provide several advantages compared to the background art. For example, multiple applications referenced in a sequence vector may independently influence routing, rather than just the one application in a sequence vector unilaterally influencing routing.

In another advantage, embodiments in accordance with the present invention may provide for routing to be influenced or determined by a sequenced SIP proxy, rather than requiring an application to handle complexities of SIP Back to Back User Agents (B2BUAs). For example, using operation directives such as add media server legs (to be used for recording), the sequenced applications may remain as simple proxies. The arbitrator will then apply a consolidated action based upon harmonizing the operation directives. If the arbitrator does not have the B2BUA capabilities itself (e.g., a session manager), then the arbitrator will invoke a B2BUA element to apply the consolidated action. Therefore, only a single element with B2BUA capabilities is needed, rather than multiple elements.

In another advantage, embodiments in accordance with the present invention may provide for a single point to arbitrate among conflicting requests from applications, rather than allowing applications to make requests without coordination.

In another advantage, embodiments in accordance with the present invention may provide for notifying or allowing upstream applications visibility into what downstream applications have asked for. This may also provide for simplifying processing by upstream applications, by being aware of downstream routing actions.

In another advantage, embodiments in accordance with the present invention may provide for simplifying downstream applications by freeing them from a need to track multiple SIP dialogs for a single routed call. Instead the applications see only one dialog since the forking will be done downstream by the central proxy.

In another advantage, embodiments in accordance with the present invention may provide for reduced or eliminated need to design an execution order of sequenced applications. Changing the execution order does not change the behavior because inconsistencies or incompatibilities will be harmonized by the central proxy.

In another advantage, embodiments in accordance with the present invention may provide for a reduced need for an application to know routing details. For example, an application can request that a call be routed to coverage, yet the application does not need to implement the coverage function itself. Coverage in this context refers to alternate or alternative terminal elements, station, user application ("UA") that perform a backup role for calls to a primary terminal element, station, device, or user application. A terminal element, station, device, or user application in this context may be referred to herein as a "user." For example, a voice mail UA may cover calls for a primary user. Coverage for the voice mail UA may specify how long to ring a user, before forwarding the call to a backup, covering device.

In one embodiment in accordance with the present invention, a primary station may have more than one backup, covering station, such that after ringing the primary station for a specified time, all the coverage stations will ring. In another embodiment, one backup covering station may provide coverage for many primary stations.

Coverage stations may have to be configured for each user. An application may use operation directives to suggest routing the call to coverage, in which case the arbitrator is the only device that needs to know this requested configuration. Without the operation directives, each application would have to know how to invoke coverage.

Coverage may be difficult to design and invoke in certain situations. For example, a call to coverage should not go to a covering station's voicemail, or to be further forwarded to the covering stations coverage.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

IP Multimedia Subsystem ("IMS") application sequencing is allowed relatively broad latitude with few restrictions during operation. However, because IMS application sequencing lacks restrictions that would be useful for improving cooperation with other IMS applications, IMS application sequencing without extensions are not well suited to enterprise applications, which are not free to work independently. For example, guidelines for IMS application sequencing may presently include loosely-defined limits such as no more than around two or three applications may be chained, or that applications should negotiate feature interactions among themselves, and so forth. This leads to design of tightly coupled applications, e.g., the design of such applications may be based upon undocumented limitations or expectations of other applications, and when performance of the other applications departs from the undocumented limitations or expectations, undesirable interactions are more likely.

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize sequenced applications in order to provide certain functionality for a communications call.

The exemplary systems and methods of this disclosure will also be described in relation to sequenced application software, modules, and associated sequenced application hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, the term "SIP proxy" may generally refer to processes that route SIP requests and responses on behalf of user agents. A SIP proxy may be stateful or stateless. Stateful SIP proxies remember SIP transaction state and are able to perform functions like forking (i.e., an advanced form of routing for contact resolution).

As used herein, the term "session manager" may generally refer to a control mechanism for one or more modules or network elements. A session manager may operate at a higher level abstraction than a SIP proxy. A session manager may manage call sessions, and may present the call requests to a sequence of applications before resolving conflicting call requests and calling the requested devices and or forwarding the requested call to other session managers. A session manager may act as a central proxy of a system.

As used herein, the term "arbiter," "arbitration module," "arbitration proxy," and so forth may generally refer to a part of a system that collects header directives, analyzes the header directives, and decides which header directives to act upon and/or which header directives to skip or otherwise not fully carry out.

As used herein, the term "contact resolution" may generally refer to a part of a SIP proxy or session manager that looks up contacts registered for a user's address, or address of record, and sends the request to all or a subset of the contacts. Embodiments in accordance with the present invention influence the list of contacts by use of header directives, which may direct the contact resolution to resolve the contacts to a subset of the normal contacts and/or add other contacts or addresses of record to which the call should be sent.

As used herein, the term "sequenced application" may generally refer to an application through which a central proxy or session manager sequences a call request.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Users or any other addressable entities in a SIP framework are identified by Universal Resource Identifiers (URI). Each such Internet-style address (for example, sip: johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

A SIP-based communication control system may be linked via communication channel to a wide area communication network as well. The communication control system may be, for instance, an Avaya Aura™ Session Manager. The session manager may select the network applications that are used during origination and termination sequencing phases, based generally on the identities of calling and called parties that are involved in a communication session. This list of servers (e.g., feature servers) that form the sequence vector may be administered at user provisioning time. The calling party's provisioning profile provides the originating sequence vector whereas the called party's profile provides the terminating sequence vector. These two vectors combined provide a map of how a session initiation request travels from calling party to called party in the network.

A communication channel may carry the real-time voice and video media stream under the direction and control of signals that conform to Session Initiation Protocol ("SIP"), also known as RFC 3261. The media stream(s) are communicated using a Real-time Transport Protocol ("RTP"), also known as RFC 3550 (formerly RFC 1889), for transporting real-time data and providing Quality of Service ("QoS") feedback.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120.

Additionally, multiple servers 124 can support a common user community. For example, in geo-redundant and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Applications referenced within an application sequence vector may be referred herein as upstream applications and/or downstream applications, with respect to a predetermined application referenced within the application sequence vector. An upstream application is an application that is either performed or referenced to earlier in the application sequence vector than the predetermined application. A downstream application is an application that is either performed or referenced to later in the application sequence vector than the predetermined application.

Embodiments in accordance with the present invention may simplify the address-of-record ("AOR") User Relational Element ("URE")/Sequenced Application set to act like a single SIP Proxy whose actions can be influenced by the sequenced applications. URE is a mechanism that may be used to map users to specific functions or services. This has a benefit of allowing all sequenced applications to have visibility into a full set of influences being proposed.

Embodiments in accordance with the present invention may limit an ability of sequenced applications to modify their headers. In particular, sequenced applications may be limited only to making additions of operation directives to their headers, such as operation directives related to proxy and media. Sequenced applications would not have an ability to modify or delete headers related to proxy, media, and other functionality (e.g., retargeting, contact resolution, forking, handling SIP 4xx responses, DTMF detection, recording, etc.). Instead, changes to the functionality (e.g., routing destination) will be arbitrated by the core proxy that sequences the applications and associated media servers. An application whose routing directives conflict with routing directives from another application referenced in the sequenced vector may have its routing be skipped or it may partially executed such that routing and/or functionality that does not conflict with another application may still be executed. Partial execution of an application may include substantial processing of a call, except for routing of the results of the substantial processing if the routing would create a conflict as determined by an arbitration module (i.e., arbitration by a central proxy).

The processes carried out by the arbitration module may include a separate arbiter subprocess and a separate executive subprocess. The arbiter subprocess may operate to resolve conflicts between conflicting header directives. The executive subprocess may operate to carry out the surviving header directives after the arbiter subprocess has resolved conflicts from among the header directives.

The arbitration module may include a single processing module that carries out both the arbiter subprocess and the executive subprocess. Alternatively, the arbitration module may include more than one submodule such that the submodules are in communicative contact with each other in order to collectively perform the arbiter subprocess and the executive subprocess.

Applications operating in accordance with an embodiment of the present invention are also prevented removing headers added by other applications referenced in the sequence vector. Prevention of an application from removing or changing existing operation header directives may be by way of self-policing by the application. Alternatively, a system-level application such as the Session Manager may implement a header locking mechanism. For example, the session manager may compare headers "before" and "after" a call to an application, and correct any unauthorized changes to the header. For example, suppose that an application wants to try to be the only target for some action related to a call. In the background art the application might have simply and unilaterally removed target operation directives referencing other applications and inserted a target operation directive referencing itself. Instead, in accordance with an embodiment of the present invention, the application may now add a "remove-target" directive and add an "add-target" directive to add its own URI. Arbitration by a central proxy will resolve conflicts among conflicting operation directives, as described below in further detail.

Embodiments in accordance with the present invention treat header additions as operation directives to the core, which direct the core to influence control of proxy, media and other functionality related to the call (e.g., retargeting, contact resolution, forking, handling SIP 4xx responses). Embodiments in accordance with the present invention thus cause functionality to be executed in a central proxy or other single centralized place, which allows the central proxy to arbitrate among all the proxy operation directives. Since the sequenced applications are allowed only to add headers, the original request is seen by all downstream sequenced applications.

The single centralized place to arbitrate conflicting directives may be a proxy for routing directives. For media directives, the single centralized place to arbitrate conflicting directives may be a centralized B2BUA. The centralized B2BUA may be implemented as a single B2BUA that handles routing and media directives, or as a proxy to handle routing directives and a B2BUA to handle media directives. For media directives, if a separate proxy and B2BUA are used, these two entities would be the last two in the application sequence, with the media B2BUA followed by the proxy.

The core proxy/media server, when acting on and arbitrating among competing operation directives from the applications, returns a provisional response containing an arbitration decision along with all the header proposals that were added by the applications. Since, until notified, none of the applications know of the arbitration decision, and none of the upstream applications know of the header directives injected by down stream applications, this information is useful in the provisional response.

A final response may be sent much later by the destination-end UA, but there may be situations where applications will need to react to decisions before this final response arrives. In such a situation, the arbitrator may send its decision and all the header operation directives that it considered and return them within a timely provisional response. The provisional response allows upstream applications to learn the details of the decision by the central proxy. If an upstream application disagrees with a decision by the central proxy, then the upstream applications may try to cancel the current request and try again with a higher priority. Alternatively, the upstream application may log an error and informing the customer why the application was unable to carry out its instructions, so that the customer can rectify the problem.

Examples of operation directives that an application is permitted to add to a header are shown in Table 1, in accordance with an embodiment of the present invention. Directives may be broadly grouped into categories of Routing Influence, Call Labeling, and Media Tap Control. As referenced herein, an address-of-record ("AOR") is a SIP URI that points to a domain with a location service that can map the URI to another URI where the user might be available, i.e., a "public address" of the user. A Globally Routable User Agent ("UA") URI ("GRUU") is a publicly-accessible URI that routes to a specific UA instance.

TABLE 1

| | |
|---|---|
| Routing Influence | Add-target: (AOR\|CallerPreference\|GRUU\|"Coverage"\|"VoiceMail")" |
| | Remove-target: (AOR\|CallerPreference\|GRUU\|"Coverage"\|"VoiceMail"\|*) |
| | Deny: (486\|404\|480\|403)[;reason=(custom phrase)] |

TABLE 1-continued

| | |
|---|---|
| | Allow: |
| | Owner: (AOR) |
| Call | Private: |
| Labeling | |
| Media Tap | Record: |
| Control | (voice\|video\|im\|voice&video\|...)[;tagging][[;direction=(both\|send-only\|receive_only)] |
| | Detect_DTMF: [;digits=(reg expr)][;clamp]; direction=(both\|send-only\|receive_only) |
| | Fork-media: (voice\|video\|im);send-transmit-to=ipaddr:port; send-receive-to=ipaddr:port;) |
| | Fork-media-to-sip-device: SipURI[;direction=(both\|send-only\|receive_only)] |
| | Detect_Speech: grammar; direction=(both\|send-only\|receive_only) |
| | IM-Whisper: [;direction=(both\|send-only\|receive_only)][;reserve] |

Header operation directives related to routing influence may include the Add-target directive, the Remove-target directive, the Deny directive, the Allow directive, and the Owner directive.

The Add-target directive is used to request that the URE routes the call to the target identified by the Add-target directive. The added target may refer to a URI, in order to add the URI to the rest of the targets already present. In contrast, a SIP request to add a target may route the call only to the request URI. A sequenced application operating in accordance with an embodiment of the present invention may accomplish a fork by adding multiple Add-target directives to the call headers.

In contrast, the Remove-target directive is used to request that the URE removes the listed target from the route. The Remove-target directive will not remove a target that is added at the same priority. It only removes default targets, and targets added at lower priorities. Priority is discussed below in further detail.

For both the Add-target directive and the Remove-target directive, the parameters of the directives are:
  an AOR, which may be different from the one the URE represents, with a default scope being local AOR;
  a CallerPreference, which is similar to RFC 3841 except that CallerPreference may define only one item. For example, Mobility=mobile; or Label=+121255512121;
  a GRUU of one of the URE's contacts;
  "Coverage," which is a pointer to the coverage path for the AOR; and
  "VoiceMail," which is a pointer to the user's voice mail.

The Deny directive is used to request that the URE deny the call with a SIP response of 486, 404, 480, or 403. Deny may contain a reason parameter to have the URE return a phrase different that the default SIP phrase. If the URE accepts the Deny, it will deny the call with the requested sip response. The URE ordinarily refers to or includes the arbitrator, and the default scope is local AOR.

If a Deny directive is present, the call will be denied regardless if there are any targets. If there is an allow directive at or above the deny headers priority, the deny directive is ignored. If there are more than one deny directive with different priorities, the response code will be determined from the directive with the highest priority. If there are multiple deny directives with the same priority, the precedence of the response codes are: 404, 403, 480, 486, with the highest precedence listed first. This gives precedence to the least information about the user. Providing the least information may be desirable for privacy purposes (e.g., as part of a call blocker).

The Allow directive is used to request that the URE overrides any Deny header of the same or lesser priority, and to allow the call to go through. Deny Header of higher priority are not affected by the Allow directive. The target of the Allow directive is a URE, and the default scope is the local AOR.

The Owner directive sets the owner of an associated INVITE only to be the AOR of the URE. The Owner directive may be useful for coverage and voice mail class of features. For example, if a call is to be sent to voice mail or coverage, it should go to the Owner's voice mail or coverage, not to the AOR of the URE. The target of the Owner directive is whoever invokes features like "coverage" and "voicemail". The default scope of the Owner directive is "*" (i.e., global scope). Global scope is useful here to allow call forwarding to go to another URE. The directive is important with respect to forwarded calls so that voice mail intended for a first URE does not go to the second URE.

The Private directive is used to set the default privacy setting of the present call to be private. The privacy setting may be changed later by the user on the call. The Private directive may disallow other users from bridging onto the call. The target of the Private directive is the endpoint.

Header directives related to Media Tap Control may include the Record directive, the Detect DTMF directive, the Fork-media directive, the Detect Speech directive, the Get-ConferenceTalkerEvents directive, and the IM-Whisper directive. Media Tap provides a centralized capability for Media recording by an entity. Media Tap manipulates SDP header information, but otherwise may appear to be a Proxy. The Media Tap may be controlled by SIP Header messages injected by sequenced applications, and the Media Tap may be located at the end of the sequence vector.

Media Tap functions include providing a centralized record, observing service usage, providing lawful intercept, DTMF detection/clamping, call classification, and so forth. The media tap is provided at the end of a sequence that can control a media server such as an MSMSL server. The media tap accepts commands in the SIP message headers, and subscriptions are created from the application to the media tap, so that the media tap can NOTIFY the application on occurrence of media events.

An architectural style that underlies the Web is REpresentational State Transfer ("REST"). A web service that is compatible with REST is said to be "RESTful."

The media tap accepts SIP Message methods to change the media tap request during a call. Alternatively, the media tap may accept commands via an HTTP interface, for example with a RESTful interface provided by the media tap to allow the application to control the media tap. The media tap may operate similarly to an application layer gateway ("ALG"), in that the media tap may operate like a proxy except for changing the body of the SDP message. For example, the media tap may send SIP RE-INVITE messages, but does not change dialog ID or contacts.

Media tap may perform functions like DTMF detection, voice recording, answering machine detection, etc. Embodiments in accordance with the present invention may move PBX features into a media tap which can be used by external sequence applications. Further benefits of the media tap functions are to decentralize control, may reduce resource use by reducing or eliminating multiple recording of same conversation, reduces feature interactions, and allows other applications to leverage a central capability. Instead of every recording application having to figure out the complex recording call flows, embodiments in accordance with the present invention implement them in a centralized media tap once, and allow sequenced apps to enable them through media header directives.

Embodiments in accordance with the present invention may provide a reserve parameter, such that if reserve parameter set, then the requested media tap resource is reserved, but not run yet.

The Record directive instructs the media tap to record the call, without influencing the media negotiated by the SIP UAs, i.e., without influencing the physical layer characteristics of the call. If an owner-contact parameter is defined, an implicit subscription may be set up to the contact, to inform the application of messages returned by the media tap function (e.g., error messages).

A tagging parameter may be provided, such that the call will be tagged by who is talking and when they are talking.

In the notifications, the media tap may send a URI to a RESTful web service for the media tap's Record service. Each such application may have a different session in the URI so that it is not until they all stop the recording that the recording actually stops, although each application will only be able to retrieve the portion of the recording that that application requested be recorded.

The Detect-DTMF directive instructions the media tap to detect DTMF digits. The syntax of the Detect-DTMF may include a regular expression ("reg exp") as known at least to persons familiar with Unix or Linux. If a reg exp is present, then media tap in response to the Detect-DTMF directive will only detect the digits that match the reg exp. The default scope is global scope. If two applications request the same clamping, then both get notifications of the same events. If two applications request different DTMF digits, then they will be notified of different events.

The syntax of the Detect-DTMF may include a clamp parameter, which indicates which if any detected digits are clamped. A media tap sits in the media stream between two endpoints. If one endpoint sends a DTMF digit to the other, the media tap can detect it and send the DTMF event to the application over a SIP NOTIFY. If clamping is turned on, the media tap will "clamp" the digit, and stop it from going to the far end device over the media path. If clamp is not turned on, then the far end devices will hear the DTMF digit.

The syntax of the Detect-DTMF may include an owner-contact parameter. If an owner-contact parameter is present, an implicit subscription may be set up to the contact to inform the application of DTMF events for the clamped digits.

In the SIP notifications from the Media tap to the application, the media tap sends a URI to a RESTful web service for the Detect-DTMF directive. Each application will have a different session in the URI so that it is not until they all stop detecting DTMF that the Detect-DTMF function stops.

The application requests a media tap through a header directive. If the directive indicates a SIP contact, then an implicit SIP SUBSCRIPTION is set up from the application to the media tap. While this SUBSCRIPTION being set up, if there is a DTMF detected, the digit event will be set to the application with a SIP NOTIFY.

The Fork-media directive instructs the media tap to fork the media (e.g., voice, video, etc.) to a specified IP addresses and ports, one IP address and port for the media in one of the directions, and one IP address and port for the media in the opposite direction. Forking is useful when the application needs a capability that cannot be handled by the media tap. The requested capability may only read the media, and cannot change the media going to either SIP UP. For example, an application may have a speaker-trained dictation engine trained for one of the users on the call. The application can fork the voice to the speaker-trained dictation engine, and receive a text version of the user's recording, allowing the recording to be searchable.

The Fork-media-to-SIP-device directive instructions the media tap to fork the media (e.g., voice, video, etc.) to a SIP URI. The directive will cause the media tap to make a call to the SIP URI and, when the call is answered, send the tapped voice to the SIP URI. The Fork-media-to-SIP-device directive is a convenience feature that is useful when an application wants to fork the media to a SIP endpoint.

The Detect-Speech directive instructions the media tap to detect speech. The "grammar" parameter included in Table 1 defines the phrases that are to be detected. An optional owner-contact parameter may be defined, which would indicate that an implicit subscription should be set up to the owner-contact, to inform the owner-contact of the speech events. In the notifications, the media tap may send a URI to a RESTful web service for the media tap's Detect Speech service.

The IM-Whisper directive allows an application to send text to the media tap, which the media tap converts to speech. The media tap then injects the speech into the media path. If an optional owner-contact parameter is present, then an implicit subscription is set up to the owner-contact to inform the application of the RESTful web service URI to the IM-Whisper Service. The RESTful web service allows the application to control the IM-Whisper, and to set the text to be injected. Each application will have a different session in the URI. If multiple applications set the IM-Whisper header, the media tap may mix all of them, may play them in sequence, or may only send the one with highest precedence.

In accordance with an embodiment of the present invention, a directive added to the header may contain a priority, which gives an arbitration process in the proxy hints as to which of conflicting directives take priority. Priorities may be tuned later by examination of system logs. In an application administration configuration, customers can set the priority of their application's features, which affects the priority of the directives it sends. So if a customer finds that one application's feature is overriding another application's feature, it can tune the system by change the apps feature's priority through the application administrative interface. Directives may also include default priority rules if none is included in the header. Examples of default priority rules may include:

(a) "Deny" over "Coverage" over "VoiceMail" over any targets regardless of priority. For example, if one application injects a header with "deny" and another application injects a header to send the call to voicemail, and both headers have the same priority set, the Deny would override the Voicemail Coverage, and so the call will be Denied (perhaps with busy) instead of being forwarded to the user's voice mail;

(b) Higher priority directives over lower priority directives;

(c) If directives are at a same priority, then (1) Add-Target over Remove-Target; and (2) Allow over Deny;

(d) If a response is received that includes multiple Deny headers directives, then the overall priority is from the highest-priority header. The Headers are used to direct the central proxy/media tap;

(e) If multiple Deny headers are received with a same priority, a SIP 404 (Not Found) status code response takes precedence over a SIP 403 (Forbidden) status code response, which in turn takes precedence over a SIP 480 (Temporarily Unavailable) status code response, which in turn takes precedence over a SIP 486 (Busy Here) status code response.

Header directives added by embodiments in accordance with the present invention may utilize certain header parameters. These parameters can be used on any injected header, not just headers adapted to embodiments in accordance with the present invention. For example, the Alert-Info header field, which is used to specify an alternative ring tone to the UA, may also include one or more of the parameters listed herein. The priority or owner_name can be used to arbitrate between two conflicting applications setting the Alert-Info header field.

Applications ordinarily cannot inject headers directives based on injections from downstream applications in the sequence vector. In order to inform upstream applications, a final URE stage places injected headers in a SIP 183 Progress message so that upstream applications can be informed, and take action if they are overridden. For example, an upstream application can send a SIP CANCEL down stream, then resend the SIP request down stream with adjusted headers.

Embodiments in accordance with the present invention may cause sequenced applications to behave like limited SIP proxies. Sequenced applications in accordance with embodiments of the present invention would limit this behavior by not re-writing the request run (directly retargeting the request), and forking the request. Such a sequenced application may be implemented as a SIP proxy as defined in RFC 3261, however a sequenced application need not be implemented only as a pure SIP proxy.

Sequenced applications in accordance with embodiments of the present invention should not send SIP 4xx replies (i.e., client failure responses) without further control or oversight. Instead, such sequenced application should submit a requested action to the URE through appropriate header messaging to send the SIP 4xx client failure response messages. Such sequenced applications also should not send SIP 2xx replies (i.e., responses indicative of success). SIP proxies route calls to other endpoints. It is the other endpoints that send back SIP 2xx replies to accept a request and create a SIP dialog between the endpoint and the originator. The SIP proxy is not allowed to terminate a call, so it cannot answer the call with a SIP 2xx response. Such applications having a need to change the SDP may send another SIP INVITE message in order to re-invite the recipient with the desired SDP.

Sequenced applications in accordance with embodiments of the present invention may request action by the URE proxy tail end by injecting specialized headers in the passing requests. Such sequenced applications having a need to influence the URE proxy head end may inject specialized headers within the passing responses destined for the URE proxy head end.

If a sequenced application in accordance with embodiments of the present invention needs to function as a SIP UA, then it performs two functions, one as a sequenced application proxy, and one as a SIP UA that can be resolved through contact resolution. The sequenced application can route the call to its SIP UA by inserting headers to request action by the URE proxy tail end. The sequenced application is a proxy in this scenario, so it cannot answer a call. If such an application wants to answer a call, it routes the call to itself, using a routing directive, and then answers the call. In this scenario the application is playing two roles, first as a proxy in the sequence, and second as a SIP endpoint to answer the call. The SIP endpoint is a SIP UA, and the proxy is a SIP PROXY.

Session affinity, so that the UA and Proxy portions of the application can share state, is handled by the dialog ID of SIP messages, which uniquely identifies the dialog or session. The UA and PROXY can use the dialog ID to share state.

After all sequenced applications have had an opportunity to insert a directive into the header, a final process analyzes the header directives and resolve injected header conflicts, and removes header conflicts before the URE tail end processing The final process may be implemented by a central proxy, session manager, SIP proxy, IP-PBX, etc., or may include an application anchored at the end of the application sequence.

Figure 3:
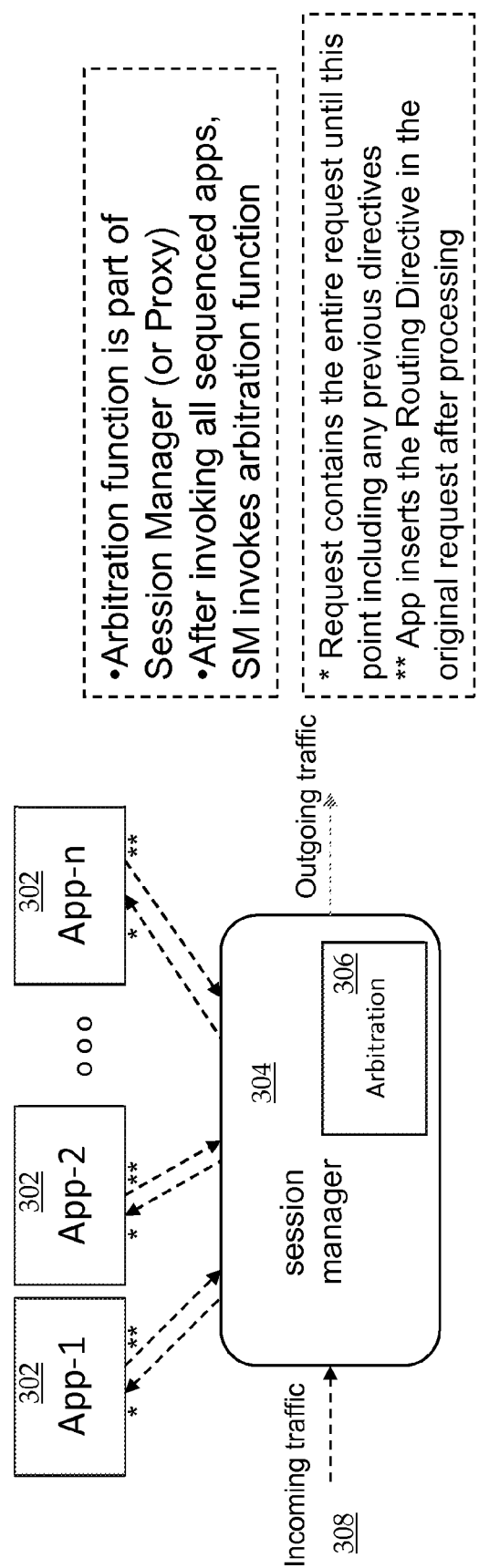
FIG. 3 illustrates at a high level of abstraction a process for handling operation directives from sequenced applications by a session manager, in accordance with an embodiment of the present invention.

For example, FIG. 3 illustrates a process 300 in accordance with an embodiment of the present invention in which the final process is implemented as an arbitration module 306 within a session manager 304 or other proxy. Session manager 304 receives incoming traffic 308 and routes it through one or more sequenced applications 302, which are able to add to the message header a requested directive in accordance with an embodiment of the present invention. Upon receipt by a sequenced application 302, the header contains the entire set of requested directives up to that point, including any directives requested by previous sequenced applications 302 in the sequence vector. After processing by sequenced application 302, its requested directives will have been inserted into the header.

At the conclusion of the last sequenced applications 302, arbitration module 306 is invoked by session manager 304 in order to resolve conflicts among the added headers, and then session manager 304 routes the outgoing traffic to the appropriate destination(s).

Figure 4:
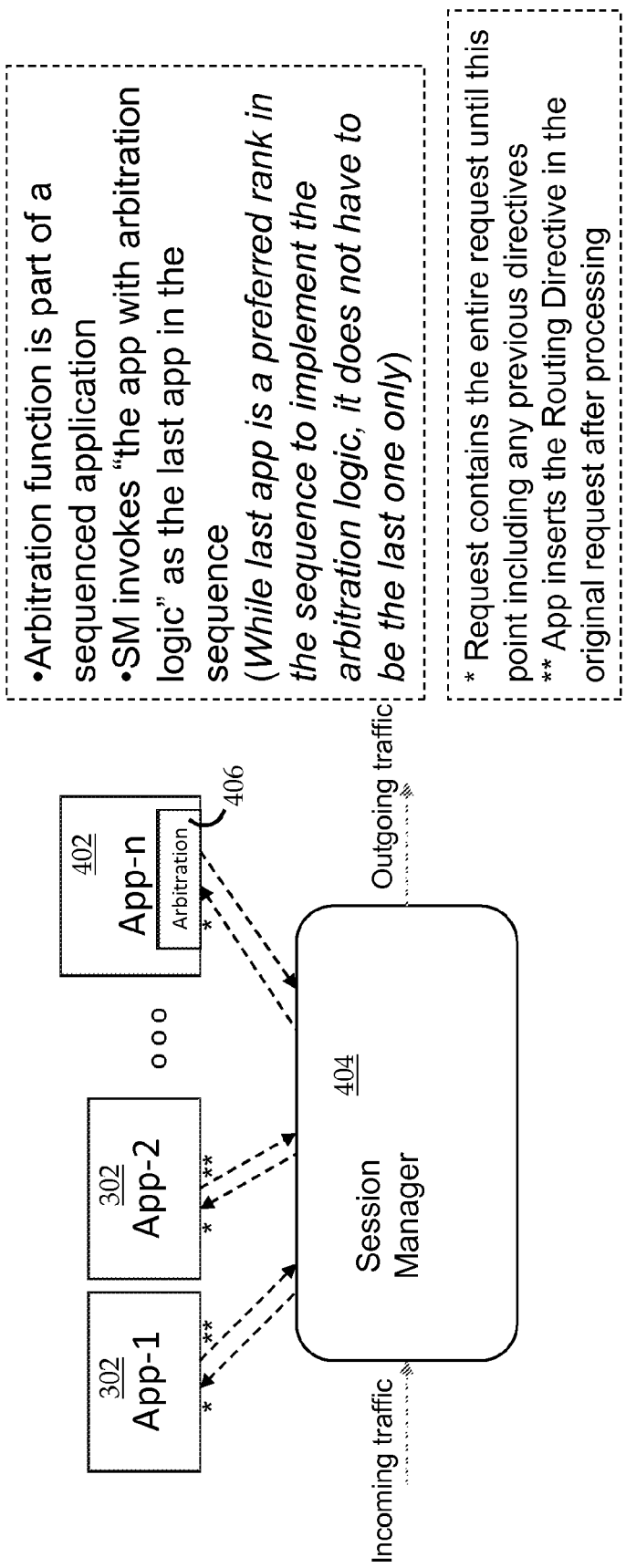
FIG. 4 illustrates at a high level of abstraction a process for handling operation directives from sequenced applications by a last sequenced application, in accordance with an embodiment of the present invention.

FIG. 4 illustrates a process 400 in accordance with an embodiment of the present invention in which the final process is implemented as an arbitration module 406 within a sequenced application 402. Although sequenced application 402 is typically the last application referenced in the sequence vector, arbitration module 406 may be located earlier in the sequence vector, or in multiple sequenced applications, in order to resolve conflicts up to that point.

Figure 5:
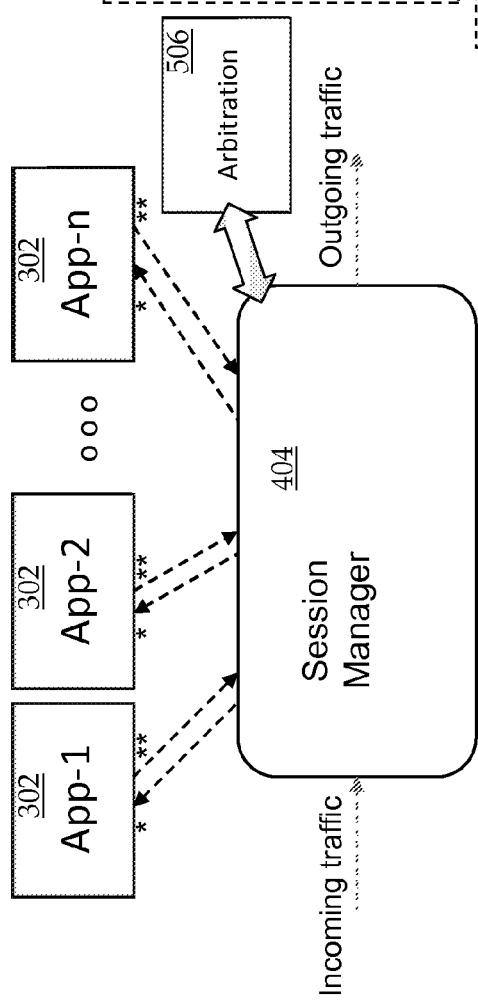
FIG. 5 illustrates at a high level of abstraction a process for handling operation directives from sequenced applications by a separate arbitration module, in accordance with an embodiment of the present invention.

FIG. 5 illustrates a process 500 in accordance with an embodiment of the present invention in which the final process is implemented as a stand-alone arbitration module 506, i.e., arbitration module 506 is not necessarily part of either session manager 404 or a sequenced application 302. After all of the sequenced applications 302 have been invoked, session manager 404 may invoke arbitration module 506 by way of a non-sequence interface (e.g., a RESTful interface).

The final process may arbitrate conflicts in the injected routing headers. The final process may respond to all applications with a SIP 183 Session in Progress message that includes all the injected headers. This message allows the applications to see what is being requested by other applications. The final process will attend to routing messages according to the injected routing headers.

At the head end of a string of sequenced vectors, a retry of an INVITE may be sent if a retry header had been injected in the SIP 4xx response.

Embodiments in accordance with the present invention provide reduce complexities in the known art introduced by B2BUA and forking proxy sequenced applications. A single point is used as a final process to controlling routing, thereby reducing restrictions on applications because the applications can make routing requests that will be arbitrated by the final process. Having the final process control routing may also improve the ability for conflicts to be logged.

Embodiments in accordance with the present invention simplify URE processing by moving SIP UA applications to the same part of the architecture where SIP UA endpoints reside. The URE as a whole is simplified, by making the URE a SIP Proxy which can be controlled by the sequencing applications. From the outside, the URE appears to be a plain SIP Proxy. Embodiments in accordance with the present invention allow applications to see routing influences and react to SIP 4xx messages and Cancellations. Embodiments also allow applications to work together and reduce conflicts.

Embodiments in accordance with the present invention may initially provision applications with a maximum priority.

For such initial provisioning, the arbitrator may reduce an application's header priority if it exceeds a predetermined maximum.

Header directives added by embodiments in accordance with the present invention may also include the common parameters listed below.

(a) Priority=(1-10), with a default value of 1. The Priority header field indicates the urgency of the request as perceived by the client. The Priority header field describes the priority that the SIP request should have to the receiving human or its agent. For example, it may be factored into decisions about call routing and acceptance.

(b) Owner_name=(Name of owning app). If this field is not present in the header, the header is ignored.

(c) Owner_contact=(sip: . . . ). This is an optional field describing a URI of the owner.

(d) Scope=(sipdomain|AOR|gruu|*)[&(sipdomain|AOR|gruu)+]. This is an optional parameter that defines the scope of the directive. If the scope is local, it only applies to the local URE/central proxy. For example, if the application sets a directive in one user's sequenced applications with AOR scope, the directive will be removed if the request gets forwarded to another URE. If the scope is global, the directive remains in effect, and SIPdomain would only stay while the request is within the URE of the same SIP domain. So if an add-target header is applied, the scope is AOR, and if the call is later forwarded from a second user to the first user, the add-target is not longer applied.

Figure 2:
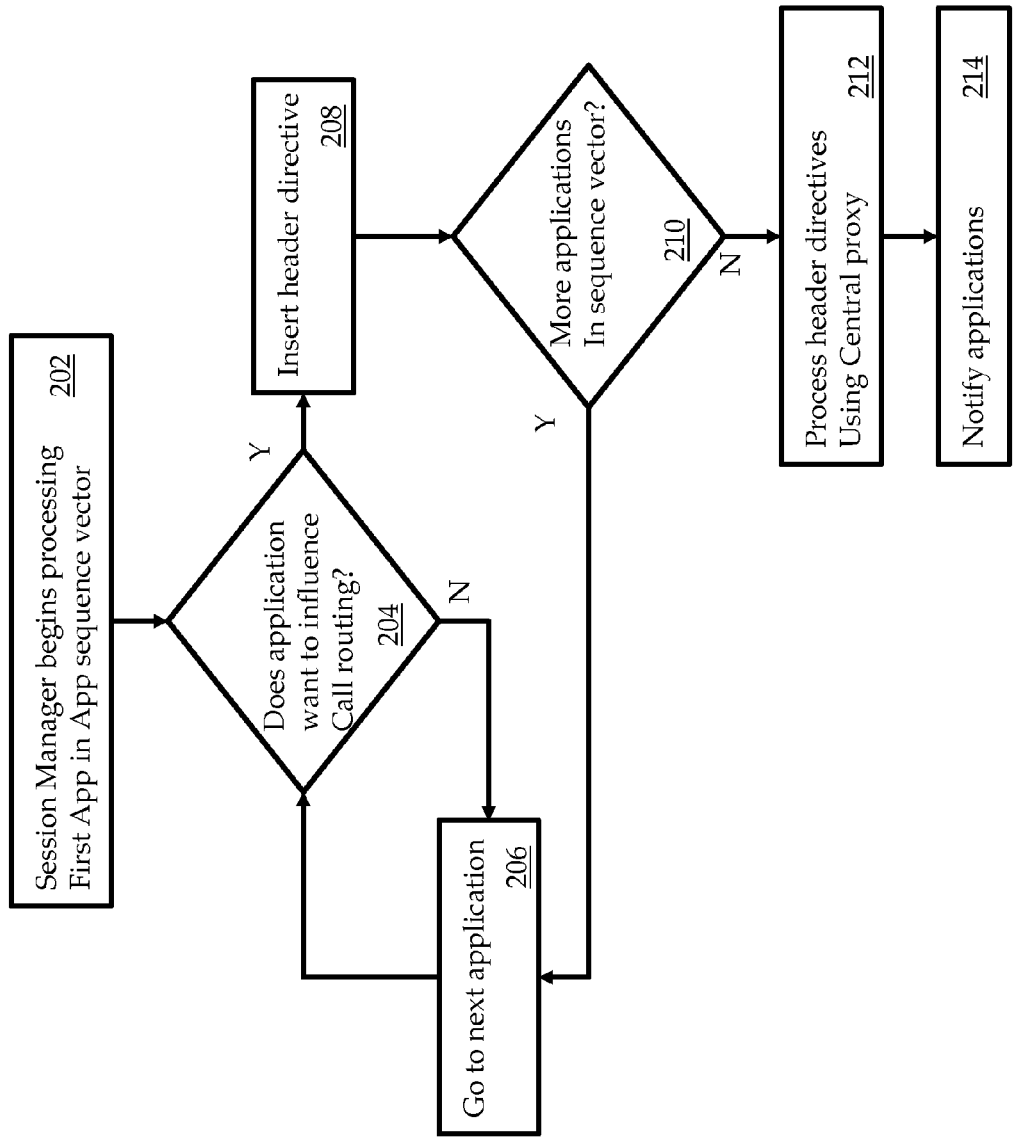
FIG. 2 illustrates at a high level of abstraction a process for handling operation directives from sequenced applications, in accordance with an embodiment of the present invention.

FIG. 2 illustrates a process 200 in accordance with an embodiment of the present invention. Process 200 begins at step 202, at which the session manager begins to process the first application in an application sequence vector.

Next, at step 204, the session manager determines whether the application seeks to change or influence call routing, e.g., by adding/deleting/changing a destination for the call.

If the application referenced in step 204 does not seek to change or influence call routing, then at step 206 the process 200 advances to the next application in the sequence vector. However, if the application referenced in step 204 does seek to change or influence call routing, then process 200 advances to step 208 at which a new header directive is inserted into the call processing headers for the call.

Next, at step 210, the session manager determines whether there are more applications in the sequence vector that need to be processed. If the answer to step 210 is affirmative, then control of process 200 transfers to step 206 described above. If the answer to step 210 is negative, then control of process 200 transfers to step 212 at which the central proxy will process the header directives and resolve conflicts.

Finally, at step 214, the applications referenced in the sequence vector are notified of the final routing decisions made by the central proxy.

Embodiments of the present invention include a system having one or more processing units coupled to one or more memories. The one or more memories may be configured to store software that, when executed by the one or more processing unit, allows for sequenced applications to influence SIP routing, at least by use of processes described herein, including at least in FIG. 2, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to influence routing of a call by a sequenced application from among a plurality of sequenced applications, comprising:
receiving a header for the call, the header comprising at least one directive respectively from each of two or more of the plurality of sequenced applications;
arbitrating conflicts from among the directives in the header, in order to determine a set of sequenced application headers to at least partially execute; and
at least partially executing the set of sequenced application headers,
wherein the sequenced application communicates the header by use of a protocol selected from a group consisting of an HTTP protocol, a client/server protocol and a bidirectional asynchronous protocol.

2. The method of claim 1, wherein the step of at least partially executing the set of the plurality of sequenced applications comprises controlling a session manager.

3. The method of claim 2, wherein the session manager skips a directive in the header if the directive from the sequenced application conflicts with a directive from another sequenced application.

4. The method of claim 1, wherein the step of at least partially executing the set of the plurality of sequenced applications comprises controlling a proxy.

5. The method of claim 1, wherein the step of at least partially executing the set of the plurality of sequenced applications comprises controlling a SIP element to implement arbitration resolution.

6. The method of claim 1, further comprising: informing the plurality of sequenced applications of the set of the plurality of sequenced applications that were at least partially executed.

7. The method of claim 1, wherein the directive comprises one of an add-target directive and a remove-target directive.

8. The method of claim 1, wherein the directive comprises a privacy setting, wherein the privacy setting prevents bridging of the call.

9. The method of claim 1, wherein the directive comprises a priority factor used when arbitrating conflicts.

10. The method of claim 1, wherein the directive comprises a media tap control directive.

11. The method of claim 10, wherein the media tap control directive comprises a reserve parameter, wherein if the reserve parameter is set then a media tap resource is reserved but not yet run.

12. The method of claim 10, wherein the media tap control directive comprises a record directive that instructs the media tap to record the call without influencing a negotiated media.

13. A method to influence routing of a call by a sequenced application from among a plurality of sequenced applications, comprising:
    receiving a header from a call session manager;
    inserting a directive into the header by each, respectively, of two or more of the plurality of sequenced applications; and
    transmitting the header to a central proxy via the call session manager,
    wherein the central proxy is configured to arbitrate conflicts in directives in the header inserted by the plurality of sequenced applications,
    wherein the sequenced application communicates the header by use of a protocol selected from a group consisting of an HTTP protocol, a client/server protocol and a bidirectional asynchronous protocol.

14. The method of claim 13, wherein the directive comprises one of an add-target directive and a remove-target directive.

15. The method of claim 13, wherein the directive comprises a privacy setting, wherein the privacy setting prevents bridging of the call.

16. The method of claim 13, wherein the directive comprises a media tap control directive.

17. A system to influence routing of a call by a sequenced application from among a plurality of sequenced applications, comprising:
    a receiver configured to receive a header for the call, the header comprising at least one directive respectively from each of two or more of the plurality of sequenced applications;
    an arbitration module configured to arbitrate conflicts from among the directives in the header, in order to determine a set of sequenced application headers to at least partially execute; and
    an executive module used to at least partially execute the set of sequenced application headers,
    wherein the sequenced application communicates the header by use of a protocol selected from a group consisting of an HTTP protocol, a client/server protocol and a bidirectional asynchronous protocol.

18. The system of claim 17, wherein the directive comprises one of an add-target directive, a remove-target directive and a privacy setting, wherein the privacy setting prevents bridging of the call.

19. The system of claim 17, wherein the directive comprises a media tap control directive.

20. A method to influence routing of a call by a sequenced application from among a plurality of sequenced applications, comprising:
    receiving a header for the call, the header comprising at least one directive respectively from each of two or more of the plurality of sequenced applications;
    arbitrating conflicts from among the directives in the header, in order to determine a set of sequenced application headers to at least partially execute; and
    at least partially executing the set of sequenced application headers by controlling a session manager, wherein the session manager skips a directive in the header if the directive from the sequenced application conflicts with a directive from another sequenced application.

21. The method of claim 20, wherein the sequenced application communicates the header by use of a protocol selected from a group consisting of a SIP protocol, an HTTP protocol, a client/server protocol and a bidirectional asynchronous protocol.

22. The method of claim 20, wherein the step of at least partially executing the set of the plurality of sequenced applications comprises controlling a proxy.

23. The method of claim 20, wherein the step of at least partially executing the set of the plurality of sequenced applications comprises controlling a SIP element to implement arbitration resolution.

24. The method of claim 20, further comprising: informing the plurality of sequenced applications of the set of the plurality of sequenced applications that were at least partially executed.

25. The method of claim 20, wherein the directive comprises one of an add-target directive and a remove-target directive.

26. The method of claim 20, wherein the directive comprises a privacy setting, wherein the privacy setting prevents bridging of the call.

27. A method to influence routing of a call by a sequenced application from among a plurality of sequenced applications, comprising:
    receiving a header for the call, the header comprising at least one directive respectively from each of two or more of the plurality of sequenced applications, wherein the directive comprises a priority factor used when arbitrating conflicts;
    arbitrating conflicts from among the directives in the header, in order to determine a set of sequenced application headers to at least partially execute; and
    at least partially executing the set of sequenced application headers.

28. The method of claim 27, wherein the sequenced application communicates the header by use of a protocol selected from a group consisting of a SIP protocol, an HTTP protocol, a client/server protocol and a bidirectional asynchronous protocol.

29. The method of claim 27, wherein the step of at least partially executing the set of the plurality of sequenced applications comprises controlling a proxy.

30. The method of claim 27, wherein the step of at least partially executing the set of the plurality of sequenced applications comprises controlling a SIP element to implement arbitration resolution.

31. The method of claim 27, further comprising: informing the plurality of sequenced applications of the set of the plurality of sequenced applications that were at least partially executed.

32. The method of claim 27, wherein the directive comprises one of an add-target directive and a remove-target directive.

33. The method of claim 27, wherein the directive comprises a privacy setting, wherein the privacy setting prevents bridging of the call.

34. A method to influence routing of a call by a sequenced application from among a plurality of sequenced applications, comprising:
   receiving a header for the call, the header comprising at least one directive respectively from each of two or more of the plurality of sequenced applications, wherein the directive comprises a media tap control directive, and the media tap control directive comprises a reserve parameter, wherein if the reserve parameter is set then a media tap resource is reserved but not yet run;
   arbitrating conflicts from among the directives in the header, in order to determine a set of sequenced application headers to at least partially execute; and
   at least partially executing the set of sequenced application headers.

35. The method of claim 34, wherein the sequenced application communicates the header by use of a protocol selected from a group consisting of a SIP protocol, an HTTP protocol, a client/server protocol and a bidirectional asynchronous protocol.

36. The method of claim 34, wherein the step of at least partially executing the set of the plurality of sequenced applications comprises controlling a proxy.

37. The method of claim 34, wherein the step of at least partially executing the set of the plurality of sequenced applications comprises controlling a SIP element to implement arbitration resolution.

38. The method of claim 34, further comprising: informing the plurality of sequenced applications of the set of the plurality of sequenced applications that were at least partially executed.

39. The method of claim 34, wherein the directive comprises one of an add-target directive and a remove-target directive.

40. The method of claim 34, wherein the directive comprises a privacy setting, wherein the privacy setting prevents bridging of the call.

\* \* \* \* \*